S. PENNEY.
WHEEL FOR ROAD VEHICLES.
APPLICATION FILED JAN. 11, 1921.

1,390,970.

Patented Sept. 13, 1921.
2 SHEETS—SHEET 1.

INVENTOR
Sydney Penney
per Robert E. Phillips
Attorney

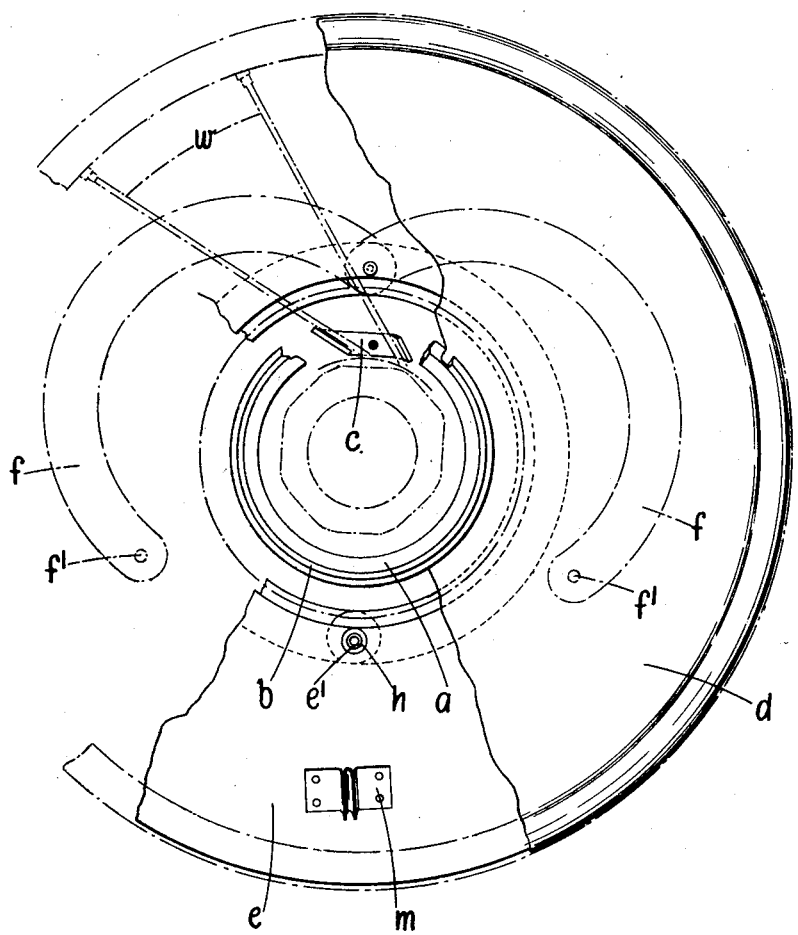

UNITED STATES PATENT OFFICE.

SYDNEY PENNEY, OF LONDON, ENGLAND.

WHEEL FOR ROAD-VEHICLES.

1,390,970.   Specification of Letters Patent.   Patented Sept. 13, 1921.

Application filed January 11, 1921. Serial No. 436,620.

*To all whom it may concern:*

Be it known that I, SYDNEY PENNEY, a subject of the King of Great Britain and Ireland, residing at London, England, have invented certain new and useful Improvements in Wheels for Road-Vehicles, (for which I have filed an application in England Jan. 2, 1920, application No. 144-20,) of which the following is a specification.

This invention relates to spoked wheels for road vehicles which are particularly adapted for use on mechanically propellel vehicles of the type in which the rim is inset in respect to the hub and in which three sets of spokes are employed two of which are dished outwardly to the two flanges of the hub and the other of which is dished inwardly to the inner flange of the hub and has special reference to methods of mounting adjustable disks on said wheels for the purpose of covering in or inclosing the spokes, and it has for its object to so attach the disks to the wheel that they can readily be mounted on the wheel and the outer one can be rapidly removed when necessary, and that the wheel can be dismounted and remounted without detaching the disks or either of them.

We attain this end by mounting on the outer end of the hub a flanged ring adapted to carry the outer disk by fixing said disk to said ring by a screw connection and by mounting on the inner disk a circumferentially adjustable device adapted to engage the flange on the inner end of the hub.

In the accompanying drawing which illustrates this invention :—

Fig. 2 is a broken view in side elevation.

In both views similar parts are marked with like letters of reference.

Figure 1:
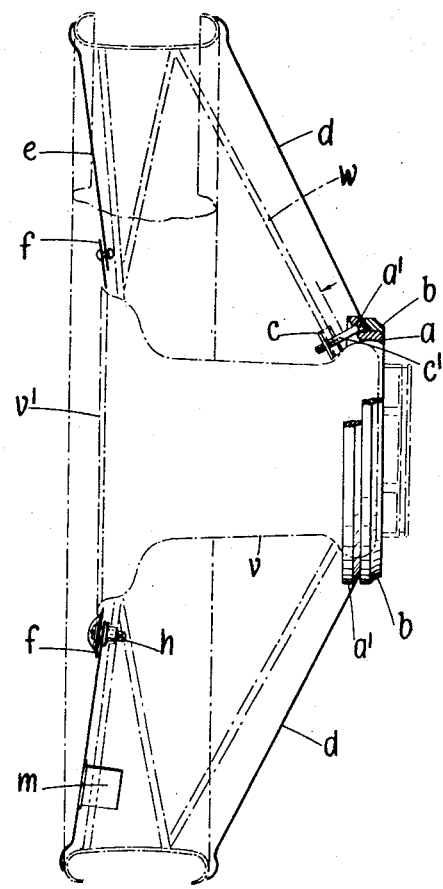
Figure 1 is a view in front elevation partly in section.

On the outer end of the hub $v$ is mounted a ring $a$ having an inclined flange $a'$ the inclination of which approximates to the angle of the spokes $w$ at the outer side of the wheel and to the dish of the disk. On the ring $a$ is threaded a nut $b$ the inner face of which is beveled to correspond to the angle of the flange $a'$ said nut being preferably ring-shaped and provided with circumferential holes or grooves to enable it to be operated by means of a pin or like spanner. The flanged ring $a$ is secured to the hub $v$ by means of plates $c$ and screws $c'$ said plates being shaped to adapt them to engage the spokes $w$ of the wheel. The disk $d$ which is dished to fit the wheel and which is curved at its outer edge to engage outer edge of the rim thereof is mounted on the flanged ring $a$ and is secured thereon by the nut $b$.

The disk $d$ may—as is now common—be provided with holes or openings either with or without doors or shutters giving access to the valve of the pneumatic tire for the purpose of enabling same to be pumped up without removing the disk.

The inner disk $e$ which is also slightly dished is curved at its outer edge to engage the inner edge of the rim and is furnished with a central aperture slightly larger than the diameter of the flange $v'$ on the hub $v$. Onto the disk $e$ are pivoted the two parts $f$ and $f$ of a divided locking ring the internal diameter of which is smaller than the diameter of the flange $v'$ on the hub. In the free end of the strips $f$ and $f$ are holes $f'$ and in the disk $e$ is a hole $e'$ to enable the ends of the strips $f$ and $f$ to be secured together and to the disk $e$ by means of a screw $h$ and thus complete the locking ring formation.

To place the disk $e$ on the wheel the two parts $f$ and $f$ of the locking ring are opened out and the disk is slipped over the flange $v'$ of the hub so that both the disk and the licking ring parts become located on the inner side of said flange and are kept in contact therewith by the springiness of the disk due to its dished shape. The free ends of the two parts of the locking ring are then brought together and secured to one another and the disk $e$ by the screw $h$.

For the purpose of preventing any relative turning movement of the disk $e$ in respect to the wheel a device such as $m$ adapted to engage one of the spokes of the wheel may be provided on the inner face of said disk.

What I claim is :—

1. A detachable cover for the outer side of spoked wheels comprising a disk extending between the hub and the rim, an L-shaped ring adapted to be attached to the spokes of the wheel adjacent to the outer flange of the hub by a plurality of radially arranged clamping devices, and a nut threaded on the horizontal element of said ring and adapted to secure said disk to said ring.

2. A detachable cover for spoked wheels comprising a dished disk having a central hole of a larger diameter than the inner flange of the hub of the wheel, a divided ring the two parts of which are pivoted to said disk at a common point and the inner diameter of which is less than that of the inner flange of the hub of the wheel, and means for securing the free ends of the two parts of the divided ring together.

SYDNEY PENNEY.